United States Patent [19]

Taylor

[11] 3,908,597
[45] Sept. 30, 1975

[54] SELF STRAINING ANIMAL LITTER BOX

[76] Inventor: Chester E. Taylor, 19757 Victory Blvd., Woodland Hills, Calif. 91364

[22] Filed: July 8, 1974

[21] Appl. No.: 486,527

[52] U.S. Cl. ................................. 119/1; 209/374
[51] Int. Cl. ........................................ A01h 29/00
[58] Field of Search ................ 119/1; 209/355, 374

[56] References Cited
UNITED STATES PATENTS

| | | | |
|---|---|---|---|
| 3,100,474 | 8/1963 | Schneider | 119/1 |
| 3,141,441 | 7/1964 | Russell | 119/1 |
| 3,796,188 | 3/1974 | Bradstreet | 119/1 |

Primary Examiner—Russell R. Kinsey
Assistant Examiner—J. N. Eskovitz
Attorney, Agent, or Firm—John E. Kelly; Pastoriza & Kelly

[57] ABSTRACT

A litter box for pets has a central receptacle divided by a partition into dual compartments that may alternately serve as upper and lower litter areas. The receptacle ends have identical covers and a pair of screened trays are positioned within the chambers.

The partition is removably retained within the receptacle which has a side wall portion formed with an entrance slot.

To switch or change the litter areas, the partition may be selectively withdrawn from the receptacle through the slot. Absorbent material is then permitted to fall from the upper chamber to the lower chamber as litter waste from the pet is retained on the upper screened tray. Thereafter the upper screened tray is emptied and returned and the partition is inserted back through the entrance slot. The entire litter box is inverted or flipped over so that the other screened tray, previously on the bottom but now on the top of the partition, may be used for the litter area.

11 Claims, 9 Drawing Figures

U.S. Patent Sept. 30,1975 3,908,597
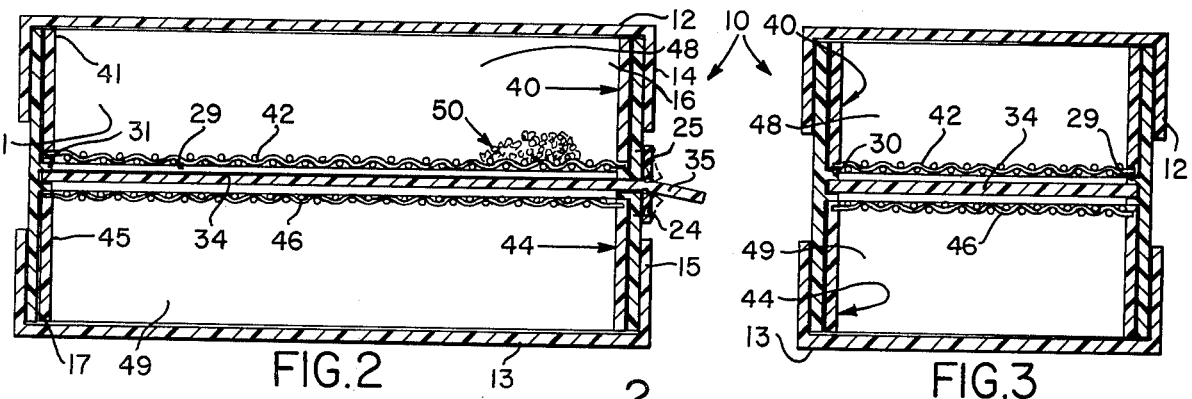
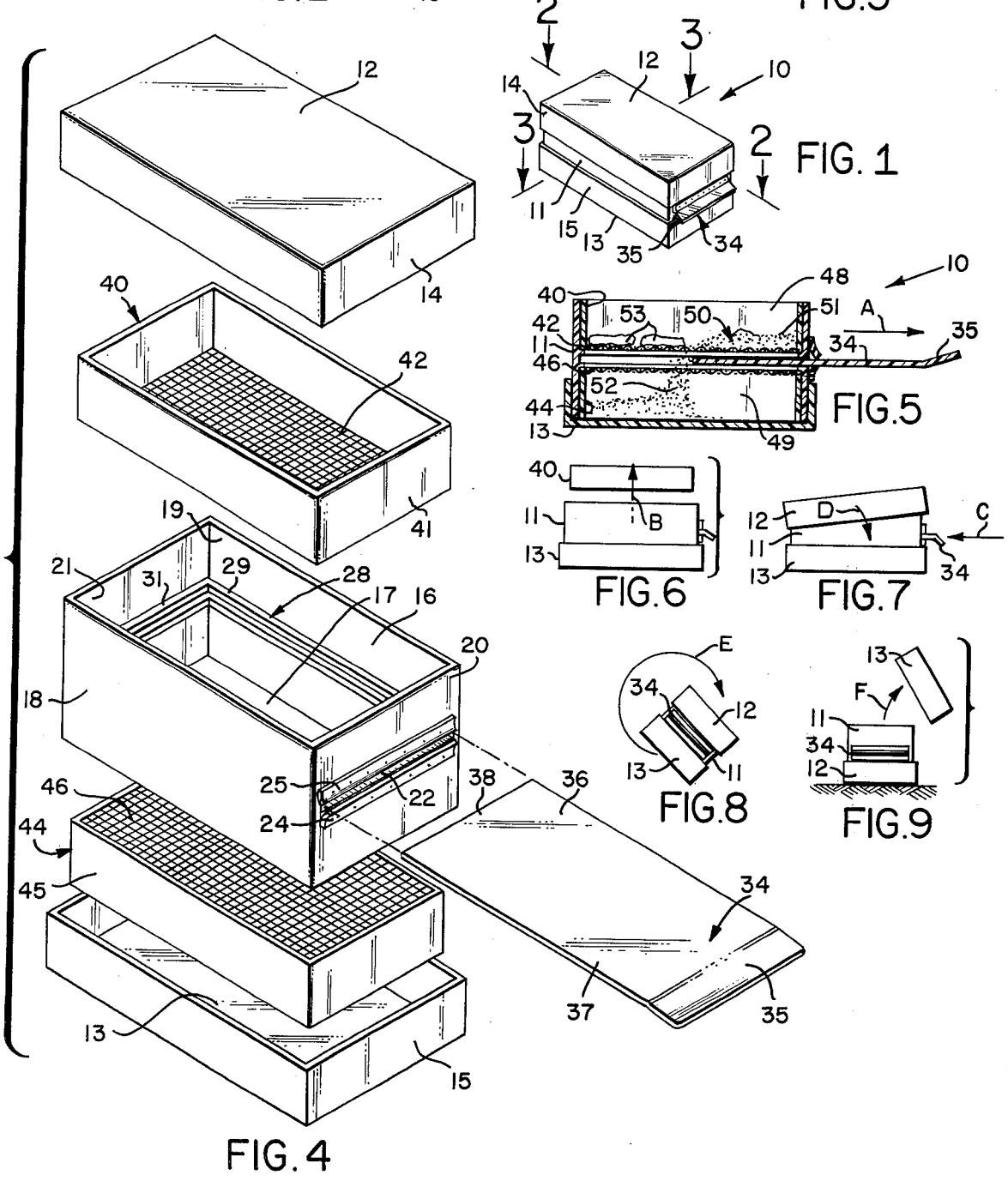

SELF STRAINING ANIMAL LITTER BOX

BACKGROUND OF THE INVENTION

This invention generally relates to litter boxes and in particular to an invertible litter box for pets that has self filtering or self straining capabilities enabling a person to dispose of litter waste with maximum ease and minimum annoyance.

Conventional litter boxes for pets such as cats and dogs are essentially large or small simple containers, partially filled with absorbent material.

When the litter waste of the pet saturates the absorbent material or becomes prematurely offensive, a person is required to dispose of the litter waste. In so doing, most if not all of the absorbent material is tossed away also.

To attempt salvaging some of the absorbent material for further usage is unsanitary and highly offensive to the person. Often hand contact is made with the litter waste while attempting to separate the absorbent material and this is further irritating.

For various practical reasons, much potentially reusable absorbent material is not saved and this is costly to the pet owner.

The litter box container must also be frequently cleaned or else pungent and malodorous fluids will soon permeate the container walls. Presently available litter boxes are not satisfactory for these reasons.

SUMMARY OF THE INVENTION

Briefly stated, this invention relates to a self filtering or self straining litter box for pets which can be conveniently and quickly manipulated by a person without any hand contact of litter waste.

In its broader aspects, the litter box embodies a generally upright receptacle formed with an open top end and an open bottom end which may be inverted so that their positions will be reversed. The receptacle has an entrance slot formed in a side wall portion. A pair of identically shaped and generally interchangeable covers are slipped over the receptacle ends.

A special holding means is secured to an interior wall portion of the receptacle and the holding means is generally arranged about halfway between the receptacle opposing ends.

A partition is removably coupled to the holding means and is oriented for passage through the entrance slot. The partition is generally aligned so that it is horizontal when the receptacle is standing in an upright position.

A first screen is disposed in a chamber defined between one of the covers and the partition. A second screen is similarly disposed in a chamber between the other cover and the partition. The screens may be removed from the receptacle when their corresponding covers are withdrawn from the receptacle ends.

The partition operates to normally block absorbent material within the receptacle from falling between a relatively upper chamber into a relatively lower chamber. When the partition is pulled externally of the receptacle through the slot, then the absorbent material is allowed to fall from the upper chamber into the lower chamber. During this action, the litter waste is retained for disposal on the screen in the upper chamber.

Preferably the holding means includes a pair of generally straight channel strips secured to opposing interior wall portions of the receptacle. The partition under these circumstances has a pair of generally straight edges which are sized to slide along and fit within their corresponding channel strips. Seating ledges are defined by the opposing sides of the channel strips and operate to engage and seat the screens.

The first screen is a part of a first tray and the second screen is a part of a second tray. The trays are arranged in the chambers with the first and second screens positioned adjacent opposite faces of the partition.

In order to facilitate removal of the partition from the receptacle, a pull tab is formed by or coupled to the partition and projects outwardly through the slot.

Scraping means may be secured to the receptable at a location adjacent the slot so as to minimize spillage and wastage of absorbent material when the partition is being withdrawn from the receptacle.

BRIEF DESCRIPTION OF THE DRAWINGS

The numerous benefits and unique aspects of the present invention will be fully understood when the following detailed description is studied in conjunction with the drawings in which:

FIG. 1 is a perspective view showing a self filtering or self straining litter box for pets constructed in accordance with this invention;

FIG. 2 is a longitudinal sectional view taken along line 2—2 of FIG. 1;

FIG. 3 is a lateral sectional view taken along line 3—3 of FIG. 1;

FIG. 4 is an exploded perspective view showing all of the important components and features of the litter box shown in FIG. 1;

FIG. 5 is a longitudinal sectional view showing some components of the litter box as the partition is being withdrawn and absorbent material is falling from an upper chamber to a lower chamber;

FIG. 6 is a generally schematic view showing the condition of some litter box components at a sequential stage after that of FIG. 5 — as the litter box is being cleaned;

FIG. 7 is a generally schematic view showing the condition of some litter box components at a sequential stage after that of FIG. 6 — as the litter box is being cleaned;

FIG. 8 is a schematic view showing the condition of some litter box components at a sequential stage after that of FIG. 7 — as the litter box is being cleaned; and, FIG. 9 is a generally schematic view showing the condition of some litter box components at a sequential stage after that of FIG. 8 — as the litter box is being cleaned.

DETAILED DESCRIPTION OF THE PREFERRED EMBODIMENT

Referring now primarily to FIGS. 1, 2, 3, and 4 a self filtering litter box 10 is shown that includes a receptacle 11 which is of general rectangular or tubular configuration with open ends.

A pair of identically shaped and interchangeable covers 12 and 13 are slipped over the opposing ends of receptacle 11. Covers 12 and 13 have rectangular shaped skirts 14 and 15 that extend towards one another and lie adjacent the external periphery of receptacle 11.

The receptacle 11 has four side walls, 18, 19, 20 and 21, side wall 20 of which is generally a front wall and side wall 21 of which is generally a rear wall. An entrance slot 22 is formed in receptacle wall 20 and extends laterally and substantially the full distance between parallel side walls 16 and 18. Entrance slot 22 is disposed generally half way between the open top end 16 and the open bottom end 17 of receptacle 11.

Positioned adjacent the entrance slot 22 and secured to receptacle side wall 20 is a scraper means shown in the form of a pair of flexible flaps 24 and 25 on opposing sides of the elongated entrance slot 22. The flaps 24 and 25 function to minimize or eliminate spillage of absorbent material contained within receptacle 11, as shall be subsequently more fully explained.

Coupled to the interior wall of receptacle 11 is a special holding means 28 that includes a pair of parallel channel strips 29 and 30 fixed to or integrally formed with receptacle side walls 16 and 18 respectively. A crossed channel strip 31 interconnects the side channel strips 29 and 30 and is secured to or integrally formed with the receptacle back wall 21.

A partition 34 of general rectangular shape is releasably retained by the holding means 28. The partition 34 as best seen in FIG. 4 is integrally formed with a flexible flap or pull tab 35 which normally projects outwardly through the entrance slot 22 in order to facilitate removal of the entire partition 34 from the receptacle 11. Partition 34 has a pair of straight parallel side edges 36 and 37 and a leading or innermost edge 38. Side edges 36 and 37 are sized to slide along and fit within their corresponding channel strips 29 and 30. Partition innermost edge 38 is shaped to engage and fit within the cross channel strip 31.

An upper tray 40 has a rectangular side wall 41 and a base constructed from a screen 42. Similarly a relatively lower tray 44 has a rectangular shaped side wall 45 and a base constructed from a screen 46. When assembled for normal use the trays 40 and 44 are reversed relative to one another and their screens 42 and 46 are disposed adjacent opposing faces of the partition 34.

Partition 34 divides the space within receptacle 11 into dual chambers, i.e., a relatively upper chamber or litter area 48 and a relatively lower chamber or litter area 49.

Reference to upper or lower components of and spaces in the litter box 10 is merely for purposes of illustration and explanation. By flipping over or inverting the litter box 10, for purposes that shall be fully described, the lower components and spaces alternately become the upper components and spaces and vice versa.

Also for purposes of best describing the invention embodied by litter box 10, it has been described in connection with particular pets such as cats or dogs. The litter box 10 is intended to be a generic phrase encompassing cages, pens, hutches, houses and all other animal enclosures for accommodating all pets such as animals or birds.

The components of litter box 10 may be constructed from plastic such as polyethylene or any other conventional and durable material. The sizes or size of the openings in the mesh, grid or screen material for screen 42 and screen 46 is selected to retain solid excrement or litter waste from pets while permitting passage therethrough of conventional and commercially available absorbent material. A small amount of such absorbent material 50 is shown in FIG. 2 supported by partition 34 and covering a section of screen 42.

OPERATION

Keeping the above construction in mind, it can be understood how the previously described disadvantages of conventional litter boxes are overcome or substantially eliminated by this invention.

The particular advantages and benefits of litter box 10 can best be understood in connection with FIGS. 5, 6, 7 8, and 9 which schematically depict sequential procedures and manipulations for changing or cleaning the litter box 10.

Under normal operational usage, a pet owner deposits a supply of absorbent material 50 within the relatively upper tray 40 to cover associated screen 42. The absorbent material 50 is retained within the relatively upper chamber or litter area 48 because partition 34 prevents the litter 50 from dropping into the chamber 49 beneath partition 34.

In order to change or clean the litter box 10 a person tugs on the exposed pull tab 35 and withdraws the partition 34 from receptacle 11 as indicated by directional arrow A. As partition 34 is being withdrawn, most or at least a great deal of the absorbent material 50, no longer blocked by partition 34, falls from chamber 48 into chamber 49. A decreasing amount of absorbent material 51 remains in chamber 48 as an increasing amount of absorbent material 52 is filtered or strained through screens 42 and 46 and tumbles into chamber 49 for eventual reuse. As shown in FIG. 5, litter waste 53 is retained or caught by the screen 42 of tray 40.

The person then, referring to FIG. 6, may reach into receptacle 11 and lift out tray 40 as indicated by directional arrow B. The contained litter waste 53 is disposed of and the tray 40 and its screen may be washed.

Referring to FIG. 7, the partition 34 is reinserted through the entrance slot 22 and thrust into its normal position within receptacle 11, as indicated by directional arrow C. Tray 40 is repositioned in receptacle 11 and cover 12 is slipped over receptacle 11 as indicated by directional arrow D.

The entire litter box 10 is then flipped over or inverted as indicated by directional arrow E in FIG. 8 so that cover 12 becomes the bottom cover and cover 13 becomes the top cover. During this 180° turn, the salvaged or reusable absorbent material will fall onto partition 34 and cover the screen 46 associated with tray 44.

The pet owner or attendant may then remove cover 13 as indicated by directional arrow F and the litter box is then fully prepared for further use by the pet.

In addition to its ordinary or domestic use, the litter box 10 may be conveniently adapted for in-transit use while traveling.

During the cleaning operation, a person is not required to contact the litter waste or coagulated absorbent material or personally separate it from the reusable absorbent material. The cleaning procedure is sanitary, easily and quickly managed and highly effective.

From the foregoing, it will be evident that the present invention has provided a self straining litter box in which all of the various advantages are fully realized.

What is claimed is:

1. A litter box comprising:
 a. a generally upright receptacle formed with open top and bottom ends and a side wall portion defining a slot;
 b. a pair of covers on the receptacle ends;

c. holding means secured to an interior wall portion of the receptacle and arranged between the receptacle ends;

d. a partition removably coupled to the holding means and arranged for passage through the slot, the partition being aligned generally horizontal when the receptacle is in an upright position;

e. a first screen disposed in a chamber between a cover and the partition, the first screen being removable when the corresponding cover is withdrawn from the receptacle; and, f. a second screen disposed in a chamber between the other cover and the partition, the second screen being removable when the corresponding cover is withdrawn from the receptacle, wherein, the partition normally operates to block absorbent material from falling from a relatively upper chamber into a relatively lower chamber, and, when the partition is pulled externally through the slot then the absorbent material is allowed to fall into the lower chamber with litter waste being retained for disposal on the screen in the upper chamber.

2. The structure according to claim 1 wherein:

a. the holding means includes a pair of generally straight channel strips secured to opposing interior wall portions of the receptacle; and, b. the partition has a pair of generally straight edges, sized to slide along and fit within the channel strips.

3. The structure according to claim 2 wherein:
seating ledges are defined by the opposing sides of the channel strips and operate to engage and seat the screens.

4. The structure according to claim 2 wherein:
the channel strips are approximately half-way between the receptacle ends.

5. The structure according to claim 1 wherein:

a. a first tray includes the first screen;

b. a second tray includes the second screen, the trays being arranged in the chambers with the first and second screens adjacent opposite faces of the partition.

6. The structure according to claim 1 including:
a pull tab on the partition that projects outwardly through the slot to facilitate removal of the partition from the receptacle.

7. The structure according to claim 1 wherein:
the covers are interchangeable and are removably slipped over the receptacle ends.

8. The structure according to claim 1, including:
scraping means secured to the receptacle adjacent the slot in order to minimize spillage of absorbent material as the partition is being withdrawn from the receptacle.

9. A litter box comprising:

a. a generally upright rectangular receptacle formed with an open top end and an open bottom end;

b. means defining an entrance slot extending laterally across a receptacle side wall and generally between the receptacle ends;

c. a pair of covers removably secured to the receptacle ends;

d. holding means secured to an interior wall portion of the receptacle and arranged generally halfway between the receptacle ends, the holding means including a pair of generally straight channel strips secured to opposing interior wall portions of the receptacle;

e. a partition removably coupled to the holding means and arranged for passage through the entrance slot, the partition being formed with a pair of generally parallel and straight edges slid into the channel strips;

f. a pull tab coupled to the partition which projects outwardly through the entrance slot in order to facilitate removal of the partition from the receptacle;

g. a first tray including a screen base disposed in a chamber between a cover and the partition, the first tray being removable when the corresponding cover is withdrawn from the receptacle; and, h. a second tray including a screen base disposed in a chamber between the other cover and the partition, the second tray being removable when the corresponding cover is withdrawn from the receptacle;

wherein, the partition normally operates to block absorbent material from falling between a relatively upper chamber into a relatively lower chamber, and, when the partition is pulled externally through the entrance slot then the absorbent material is allowed to fall into the lower chamber with litter waste being retained for disposal on the screen of the tray located in the upper chamber.

10. The structure according to claim 9, wherein the holding means includes:
a third channel strip interconnecting said pair of channel strips and aligned adjacent a back wall of the receptacle for reception of the innermost or leading edge of the partition.

11. The structure according to claim 9, including:
scraping means secured to the receptacle adjacent the slot in order to minimize spillage of absorbent material as the partition is being withdrawn from the receptacle.

* * * * *